(12) United States Patent
Huang et al.

(10) Patent No.: US 8,489,127 B2
(45) Date of Patent: Jul. 16, 2013

(54) CONTEXT-BASED REVERSE GEOCODING

(75) Inventors: Ronald K. Huang, Milpitas, CA (US);
Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 12/764,057

(22) Filed: Apr. 20, 2010

(65) Prior Publication Data

US 2011/0256881 A1    Oct. 20, 2011

(51) Int. Cl.
*H04W 24/00* (2009.01)

(52) U.S. Cl.
USPC ............. 455/457; 455/456.1; 455/456.3; 455/456.4; 455/456.6

(58) Field of Classification Search
USPC .......... 455/456.1, 456.2, 456.3, 456.4, 456.5, 455/456.6; 701/494, 495, 300
See application file for complete search history.

(56) References Cited

U.S. PATENT DOCUMENTS

| | | | |
|---|---|---|---|
| 6,363,320 B1 | 3/2002 | Chou | |
| 7,668,651 B2 | 2/2010 | Searight et al. | |
| 2002/0052674 A1* | 5/2002 | Chang et al. | 700/300 |
| 2007/0191029 A1 | 8/2007 | Zarem et al. | |
| 2008/0055154 A1* | 3/2008 | Martucci et al. | 342/357.1 |
| 2008/0132251 A1 | 6/2008 | Altman et al. | |
| 2010/0088019 A1 | 4/2010 | Barcklay et al. | |
| 2011/0178811 A1* | 7/2011 | Sheridan | 705/1.1 |
| 2011/0250875 A1* | 10/2011 | Huang et al. | 455/418 |

* cited by examiner

*Primary Examiner* — Kiet Doan
*Assistant Examiner* — Dung Lam
(74) *Attorney, Agent, or Firm* — Fish & Richardson P.C.

(57) ABSTRACT

In general, in one aspect, a mobile device can perform reverse geocoding based on context, in addition to latitude and longitude coordinates. The reverse geocoding can be used to determine in which geofence among multiple geofences the mobile device is located. Thus, the mobile device can be associated with a street address, a postal code, a named land feature, or a commercial, cultural, or political entity associated with the geofence. The context can include a pattern of movement, as well as an accuracy of the latitude and longitude coordinates. Information in the context can be compared to selection criteria of the geofence. A geofence having selection criteria that match the context the best can be selected.

8 Claims, 13 Drawing Sheets

CONTEXT-BASED REVERSE GEOCODING

TECHNICAL FIELD

This disclosure relates generally to location-based processing on a mobile device.

BACKGROUND

Geocoding is a process of finding geographic coordinates (often expressed as latitude and longitude) that can be associated with other geographic data, such as a street address, a postal code, or a named land feature. Reverse geocoding can include finding geographic data, e.g., a street address, a postal code, or a named land feature to be associated with given geographic coordinates.

A mobile device, such as a smart phone, can include various hardware and software for determining current geographic coordinates of the mobile device, which can be used to identify geographic data (e.g., street address) of the mobile device through reverse geocoding. The current geographic coordinates determined by the mobile device can have various levels of accuracy. For example, a mobile device can include a receiver and software for determining a location using a global positioning system (e.g., a GPS system). GPS accuracy can be affected by a number of factors, including satellite positions, noise in a GPS signal, atmospheric conditions, and natural barriers between a GPS signal source and the mobile device. Noise can create an error between 1 to 10 meters. Objects such a mountains or buildings between a GPS satellite and the mobile device can also produce errors, sometimes up to 30 meters. The most accurate determination of position occurs when the satellite and receiver have a clear view of each other and no other objects interfere. However, a clear view is not always possible, for example, when the mobile device is located in a downtown area of a city where numerous high-rise buildings are present. In addition to GPS, the mobile device can use other technologies to determine the geographic coordinates, for example, by triangulating signals from wireless communications gateways, such as cellular signals from various cell towers of a cellular communications network. Like the GPS system, triangulating cellular signals or WiFi™ signals can produce the geographic coordinates with varied accuracy.

SUMMARY

Methods, program products, and systems of context-based reverse geocoding are disclosed. In general, in one aspect, a mobile device can perform reverse geocoding based on context, in addition to latitude and longitude coordinates. The reverse geocoding can be used to determine in which geofence among multiple geofences the mobile device is located. Thus, the mobile device can be associated with a street address, a postal code, a named land feature, or a commercial, cultural, or political entity associated with the geofence. The context can include a pattern of movement (e.g., speed, direction, and consistency), as well as a horizontal accuracy of the latitude and longitude coordinates. Information in the context can be compared to selection criteria of the geofence. A geofence having selection criteria that match the pattern of movement or the horizontal accuracy the best can be selected. An area enclosed by selected geofence can be designated as a geofenced area in which the mobile device is located. The geofenced area can be a virtual area corresponding to a physical geographic area.

In one aspect, one or more server computers can receive a current location of a mobile device and a context of the current location. The current location can include latitude and longitude coordinates. The current location can have a size corresponding to a horizontal accuracy of the latitude and longitude coordinates. The context can include a pattern of movement of the mobile device. The server computers can identify, from multiple geofences, two or more geofences intersecting the current location. The server computers can select a geofence from the two or more geofences using the context, and determine that the mobile device is located inside the selected geofence.

In one aspect, a mobile device can determine a current location of the mobile device and a context of the current location, the current location having latitude and longitude coordinates and a size corresponding to a horizontal accuracy of the current location. The context can include a pattern of movement of the mobile device. The mobile device can identify two or more geofences intersecting the current location. The mobile device can select a geofence from the two or more geofences using the context, and determining that the mobile device is located inside the selected geofence.

The details of one or more implementations of techniques of context-based reverse geocoding are set forth in the accompanying drawings and the description below. Other features, aspects, and advantages of context-based reverse geocoding will become apparent from the description, the drawings, and the claims.

BRIEF DESCRIPTION OF THE DRAWINGS

Like reference symbols in the various drawings indicate like elements.

DETAILED DESCRIPTION

Overview of Context-Based Reverse Geocoding

Figure 1:
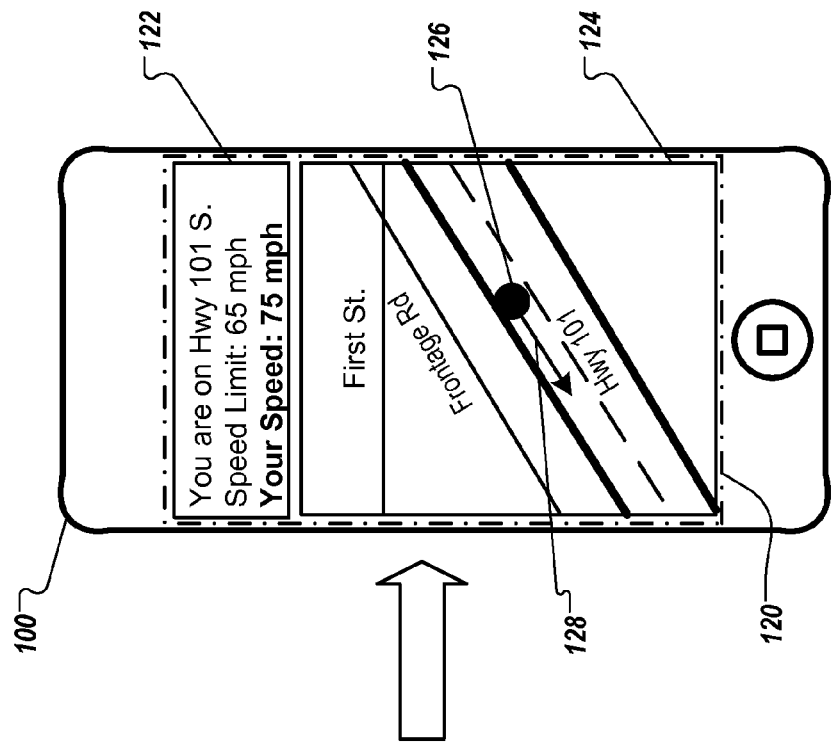
FIG. 1 illustrates exemplary techniques of selecting a geofence using reverse geocoding based on traveling speed of a mobile device.
Figure 1:
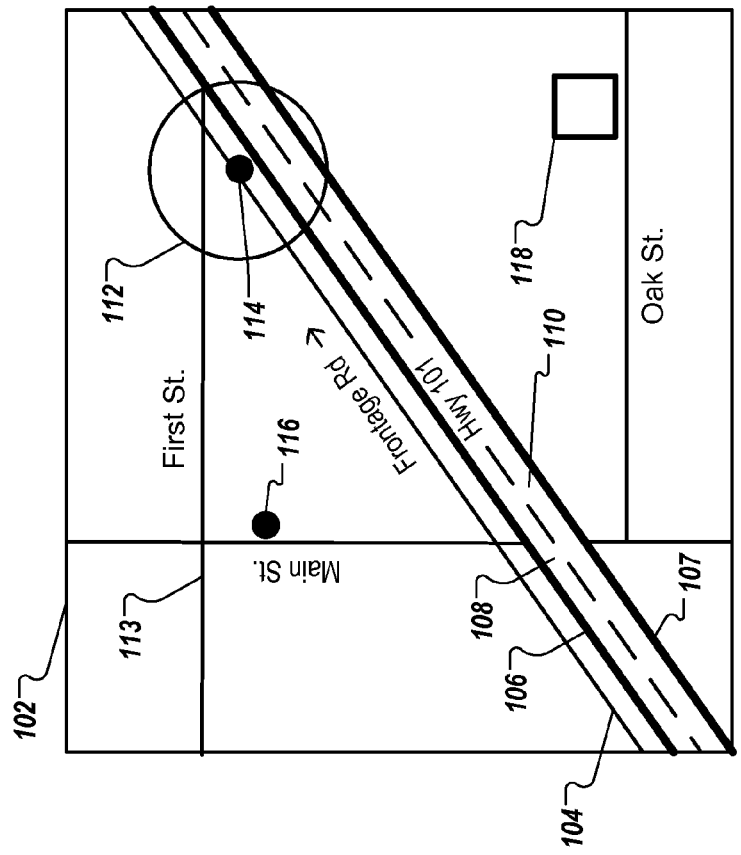

FIG. 1 illustrates exemplary techniques of selecting a geofence using reverse geocoding based on traveling speed of mobile device 100. Mobile device 100 can be an exemplary mobile device configured to implement the features and operations of context-based reverse geocoding.

Mobile device 100 can travel in a geographic region 102. Geographic region 102 can include various geographic features. The geographic features can include points (e.g., bus stop 116), lines (e.g., "First Street" 113 or "Main Street"), and areas (e.g., city hall 118). Each of the geographic features can be associated with a geofence, or a virtual perimeter surrounding the geographic feature. The geographic feature can include a street, a street address, a postal code, a named land feature, a social, commercial, cultural, historical, or political entity, a venue, or a combination of any two or more of the above. The virtual perimeter can be defined using latitude and longitude coordinates of one or more points (e.g., a series of vertices). The series of vertices can form a closed polygon that encloses the geographic feature. Data describing the geographic feature, data related to the geographic feature, and the geofence associated with the geographic feature can be stored on a storage device. A geofence can be defined by a user, for example, as a part of a geographic centric social network. Alternatively, a geofence can be determined automatically. For example, a server can receive geographic coordinates of a Topologically Integrated Geographic Encoding and Referencing (TIGER®) system, and use the geographic coordinates associated with various geographic features or placemarks to define geofences for the placemarks. The server can generate thematic data, or data describing the various placemarks, for example, by applying statistical analysis to locations of multiple location-aware mobile devices. To create a geofence around a point, the point can be treated as a circular area having a radius corresponding to a specified horizontal accuracy. The horizontal accuracy can correspond to a precision of a commercially available GPS system (e.g., 10 meters). To create a geofence around a line, the line can be treated as a rectangular area having a width corresponding to the horizontal accuracy.

When mobile device is located at or near a particular geographic feature, mobile device 100 can display on a display screen a web page about the geographic feature, or other data related to the geographic feature (e.g., a speed limit on a section of Highway 101). In some implementations, mobile device 100 can be a location-aware mobile device, which is a mobile device that can determine a current location that includes latitude and longitude coordinates of mobile device 100 using various techniques. Mobile device 100 can determine whether mobile device 100 is located at or near a geographic feature by comparing the current location of the mobile device with the polygon of the geofence surrounding the geographic feature. The comparison can occur on mobile device 100 or on a server that serves mobile device 100.

The current location of mobile device 100, as determined by mobile device 100, can have a horizontal accuracy. The horizontal accuracy can be a factor for determining in which one of multiple geofences is mobile device 100 currently located using conventional location determination methods. For example, in geographic region 102, Frontage Road 104 can be located in close proximity to Highway 101 (represented as the area between bold line 106 and bold line 107). In some geographic regions, Frontage Road 104 can be located directly under Highway 101 (e.g., under a raised section Highway 101). Mobile device 100 can determine that mobile device 100 is located at point 114 as defined using latitude and longitude coordinates. Point 114 can be associated with a horizontal accuracy. The horizontal accuracy can indicate that, with a specified certainty (e.g., 95 percent), mobile device 100 is located within circle 112. Circle 112 can be centered at point 114, and have a radius corresponding to the horizontal accuracy (e.g., 100 meters). Because of the error margin, it is possible that mobile device 100 is located in an area enclosed by any one of multiple possible geofences, e.g., a geofenced area corresponding to either Frontage Road 104, Highway 101 South (labeled 108 in FIG. 1), Highway 101 North (labeled 110 in FIG. 1), or First Street 113.

To determine in which geofenced area mobile device 100 is located, mobile device 100, or a server serving mobile device 100, can analyze a pattern of movement of mobile device 100 and selection criteria of the possible geofences. Each geofence can be associated with one or more selection criteria that correspond to various patterns of movements. For example, Frontage Road 104 can be a one-way road (represented by an arrow in FIG. 1) on which a mobile device can travel up to 25 miles per hour (mph), bearing 45 degrees (northeast). Frontage Road 104 can be associated with selection criteria that include the speed and the bearing. If mobile device 100 that is otherwise possibly located in an area enclosed by the geofence of Frontage Road 104 is traveling at a speed of 65 mph, bearing 225 degrees (southwest), there is a high probability that mobile device 100 is not traveling on Frontage Road 104 and is not located in an area enclosed by the of Frontage Road 104. By comparison, Highway 101 can have a speed limit of 65 mph. Highway 101 can correspond to two geofences: Highway 101 North (labeled 110 in FIG. 1), on which a mobile device can travel at a speed of 65 mph (plus or minus a tolerance), bearing 45 degrees, and Highway 101 South (labeled 108 in FIG. 1), on which a mobile device can travel 65 mph (plus or minus a tolerance), bearing 225 degrees.

Mobile device 100 can determine a travel speed of mobile device 100 using various means. For example, if mobile device 100 is GPS-enabled, mobile device 100 can determine a travel speed using the GPS signal. If mobile device 100 can determine a current location using triangulation of wireless access gateways, mobile device 100 can maintain a travel history data store, in which multiple locations and timestamps of the locations can be stored. Using the locations and timestamps stored in the travel history data store, mobile device 100 can calculate a distance traveled, a travel speed, and a direction of travel. For example, mobile device 100 can determine that mobile device 100 has been traveling at a speed of 75 mph, bearing 225 degrees. The traveling speed can be within a tolerance (e.g., between 45 mph and 150 mph) of speed of travel that corresponds to Highway 101 South and Highway 101 North. The direction can match the bearing of Highway 101 South. The traveling speed and direction can be a context, based on which mobile device 100 can identify a geofence corresponding to Highway 101 South.

Mobile device 100 can display information related to the identified geofence on a display device. For example, mobile device 100 can include multi-touch sensitive display screen 120. An application program, stored locally on mobile device 100 or remotely on a server serving mobile device 100, can be associated with an event of mobile device 100 crossing a geofence. Mobile device 100 can cross a geofence when mobile device 100 enters or exits a geofenced area enclosed by the geofence. For example, the application program can be invoked when mobile device 100 enters an area enclosed by the geofence of Highway 101 South. The application program can be terminated or suspended when mobile device exits the area enclosed by the geofence.

The application program can display a user interface that includes content display section 122 and map display section 124 on display screen 120. Content display section 122 can display content that relates to the identified geofence (e.g., geofence of Highway 101 South). For example, content display section 122 can display a name (e.g., "Hwy 101 S." or "Bay Shore Freeway") of the current section of Highway 101 South, a speed limit (65 mph) that applies to the current section of Highway 101 South, and a current traveling speed of mobile device 100 (e.g., 75 mph) on Highway 101 South. Map display section 124 can display a map of a vicinity of the current location, for example, a map of a section of geographic area 102 that includes First Street, Frontage Road 104, and Highway 101. Refined location 126 of mobile device 101 can be overlaid on map display section 124. In the example shown, mobile device 100 has determined that mobile device 100 is located in a geofence that corresponds to Highway 101 South. Accordingly, mobile device 100 can display refined location 126 in a polygon that corresponds to Highway 101 South on map display section 124.

In some implementations, refined location 126 can be displayed in association with arrow 128, which can indicate a direction in which mobile device 100 is traveling. Refined location 126 and arrow 128, as displayed on display screen 120, can be configured to receive a user input (e.g., a touch or a gesture). Upon receiving the user input, mobile device 100 can display content of geofences that, according to the current speed and traveling direction, mobile device 100 will enter within a threshold amount of time (e.g., five minutes).

Figure 2:
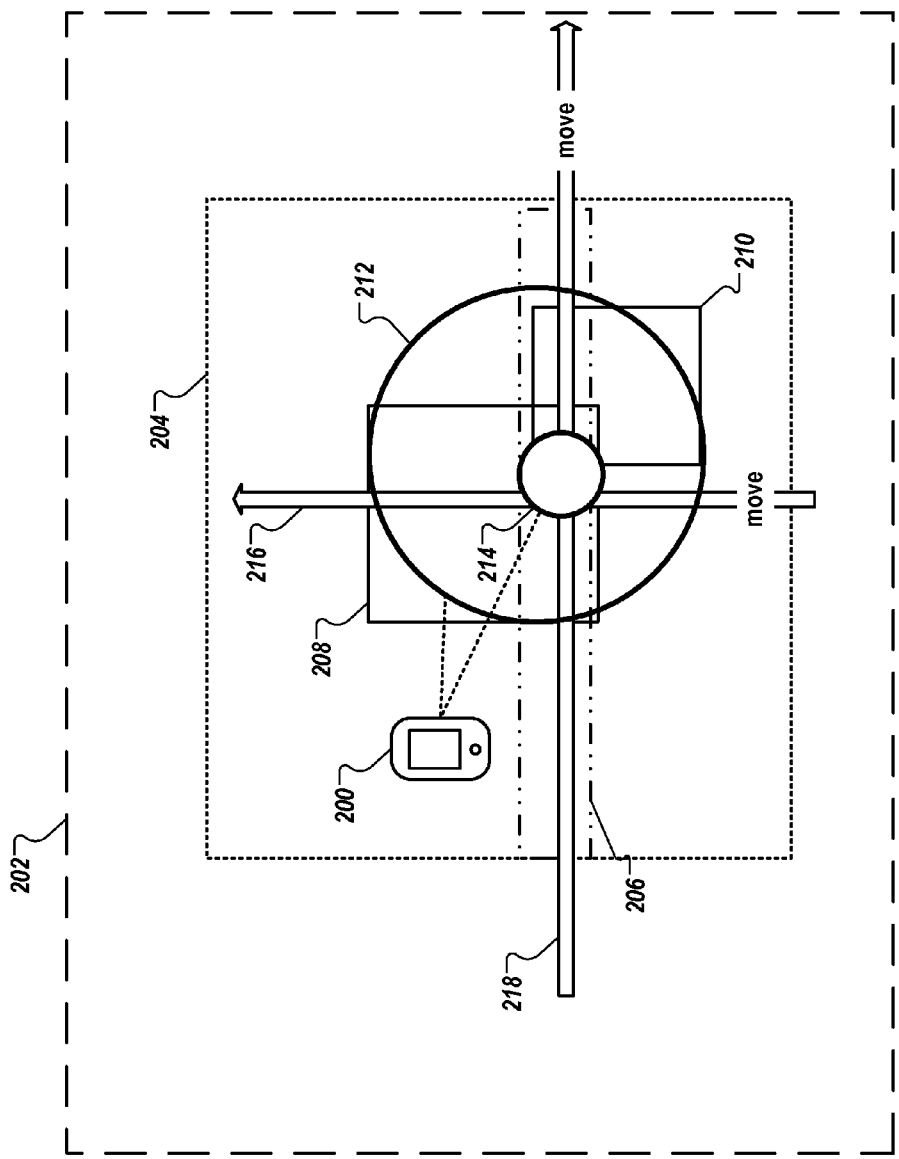
FIG. 2 illustrates exemplary techniques of selecting one or more geofences using reverse geocoding based on pattern of movement of a mobile device.

FIG. 2 illustrates exemplary techniques of selecting one or more geofences using reverse geocoding based on pattern of movement of mobile device 200. Mobile device 200 can be a mobile device such as mobile device 100 of FIG. 1.

At any given time, mobile device 200 can be located in multiple geofenced areas. Geofences can intersect one another. When two geofences intersect, the geofenced areas enclosed by the two geofences can overlap. For example, mobile device 200 can be located in areas enclosed by geofence 202, which corresponds to geographic feature "San Francisco," geofence 204, which corresponds to geographic feature "Financial District" of San Francisco, geofence 206, which corresponds to street "Bush Street" in the Financial District, geofence 208, which corresponds to "Sam's Grill and Seafood" restaurant located in a low-rise building at address 374 Bush Street, and geofence 210, which corresponds to "Singapore Airlines" located in a high-rise building at address 333 Bush Street. Sizes of the geofences drawn in FIG. 2 are for illustrative purposes and not drawn to scale. Geofences 208 and 210 can be created by users and need not strictly correspond to the physical addresses. Accordingly, although "Sam's Grill and Seafood" and "Singapore Airlines" are not located at the same street address, areas enclosed by geofences 208 and 210 corresponding to the two businesses can overlap.

Mobile device 200 can be located in a geofenced area if mobile device 200 is physically located in a geographic area enclosed by the geofence. In addition, mobile device 200 can be located a geofenced area if mobile device 200 satisfies certain selection criteria associated with the geofence enclosing the area. It is possible that mobile device 200 is physically located in a geographic area enclosed by the geofence but is not located in the geofenced area (e.g., denied entry into the geofence) due to failure to satisfy the selection criteria. Likewise, it is possible that mobile device 200, although not physically located in a geographic area enclosed by the geofence, is considered to be located in the geofenced area if certain conditions are satisfied. For example, mobile device 200 can be located in a geofenced area if, based on a current traveling speed and direction, mobile device 200 will physically cross the geofence enclosing the geofenced area within a specified threshold amount of time. The geofenced area can correspond to the geographic feature (e.g., a commercial entity) enclosed in the geofence. Neither the geofenced area nor the actual geographic area enclosed by the geofence need to match the geographic feature exactly. For example, a geographic area of a commercial entity (e.g., a restaurant) enclosed by a geofence of the commercial entity can be larger than the geographic area occupied by the commercial entity.

Based on current latitude and longitude coordinates, mobile device 200 can determine that mobile device is located a geofenced area enclosed by any of the geofences 202, 204, 206, 208, and 210. When mobile device 200 can be located in multiple geofenced areas, additional context information can be used to determine in which geofenced area mobile device 200 is located. Based on an accuracy of the latitude and longitude coordinates, or a pattern of movement of mobile device 200, or both, mobile device 200 can select one or more geofences from the multiple geofences and perform one or more tasks that correspond to the selected geofences.

In some implementations, a horizontal accuracy can be used to select a geofence. The horizontal accuracy can be an accuracy associated with a longitude coordinate and a latitude coordinate of the mobile device. The horizontal accuracy can vary (e.g., can be coarse, medium, or fine). The horizontal accuracy can be a selection criterion associated with a geofence. For example, mobile device 200 can be a mobile device that uses cell triangulation to determine coarse location 212 of mobile device 200. A coarse location can be latitude and longitude coordinates with a specified horizontal accuracy (e.g., an error margin that is greater than a threshold value of 20 meters). In FIG. 2, coarse location 212 can intersect multiple geofences (e.g., geofence 202, 204, 206, 208, and 210). A location intersects a geofence when at least a portion of an area enclosed by the geofence is located within an area defined by the latitude and longitude coordinates and the horizontal accuracy of the location. A size of the area defined by the latitude and longitude coordinates and the horizontal accuracy of the location can be referred to as a size of the location. When the location is coarse, mobile device 100 can select one or more geofences at least partially based on sizes of the geofences and the size of the location. For example, mobile device can select one or more geofences 202 and 204 that completely enclose location 212. Considering the horizontal accuracy, mobile device 200 can have a high confidence that mobile device 200 is located in geofences 202 and 204. Thus, for example, mobile device 200 can display content related to "San Francisco" or to "Financial District" of San Francisco. In some implementations, mobile device 200 can select a geofence (e.g., geofence 204) that is a smallest geofence that completely encloses location 212. Thus, for example, mobile device 200 can display content related to "Financial District" of San Francisco.

In some implementations, mobile device 200 can obtain fine location 214 of mobile device 200. Fine location 214 can be a location that has a specified horizontal accuracy (e.g., an error margin that is at or below a threshold value of 20 meters). The threshold value can vary. For example, in a downtown area, the threshold value can be set to a value that is smaller than the threshold value set for a rural area. To determine whether a geographic region is a downtown area or a rural area, mobile device 200 (or a server remotely connected to mobile device 200) can calculate a number of intersecting geofences in the geographic region. The threshold value in the geographic region can be inversely proportional to the number intersecting geofences.

When the location of mobile device 200 is a fine location (e.g., fine location 214), mobile device 200 can use a pattern of movement to select a geofence that intersects fine location 214. For example, if mobile device 200 travels at 25 mph following motion path 218, the direction of travel can correspond to a bearing of Bush Street, mobile device 200 can select geofence 206 that corresponds to Bush Street. If mobile device 200 travels at 25 mph following motion math 216, mobile device 200 can select a geofence in which the speed and direction of travel is allowable (e.g., a geofence corresponding to Kearney Street, which perpendicularly intersects Bush Street). Mobile device 200 can use the travel direction to override the determined location (e.g., location 214). For example, when location 214 does not intersect the geofence corresponding to Kearney Street, and Kearney Street is the only street in the vicinity of location 214 where the travel speed and direction are allowable, mobile device 200 can select the geofence corresponding to Kearney Street despite the determined location 214.

In some implementations, mobile device 200 can select a geofence based on an altitude of mobile device 200. For example, according to location 214, mobile device 200 can be located either in the area enclosed by geofence 208 corresponding to "Sam's Grill and Seafood" or in the area enclosed by geofence 206 corresponding to Bush Street. Mobile device 200 can be traveling at between 0 to 1 miles an hour (e.g., a user of mobile device 200 is either stationary or walking slowly), which is allowable (e.g., satisfies a selection criterion) for both geofence 206 and geofence 208. Mobile device 200 can determine that an altitude of mobile device 200 is, with a vertical accuracy, five meters above street level of a section of Bush Street proximate to location 214. According to selection criteria specified for geofences 206 and 208, the five-meter elevation is not allowable for geofence 206, but allowable for geofence 208 (which encloses a multi-story low-rise building). Mobile device 200 can select geofence 208 as a current geofence, and determine that mobile device 200 is located the area enclosed by geofence 208. Accordingly, mobile device 200 can display content related to "Sam's Grill and Seafood" restaurant.

In some implementations, mobile device 200 can select a geofence based on a vertical speed of mobile device 200. For example, according to location 214, mobile device 200 can be located in the area enclosed by geofence 210 corresponding to "Singapore Airlines" or in the area enclosed by geofence 208 corresponding to "Sam's Grill and Seafood." Mobile device 200 is stationary horizontally. Mobile device 200 can determine that an altitude of mobile device 200 is, with a vertical accuracy, five meters above street level of Bush Street at location proximate to location 214. The five-meter elevation is allowable in both geofence 208 that encloses a low-rise building and geofence 210 that encloses a high-rise building. Mobile device 200 can further determine that mobile device 100 has traveled at a vertical speed of five meters per second upwards in the last few seconds. The determination can be made using triangulation of WiFi™ access points between floors of a building. Based on the vertical travel speed, mobile device 200 can determine that mobile device 200 is located in a high-rise building that has a high-speed elevator. Accordingly, mobile device 200 can select geofence 210 as a current geofence, inside of which mobile device 200 is located. Information related to Singapore Airlines that correspond to geofence 210 can be displayed on a display screen of mobile device 200.

Exemplary Components for Systems Implementing Context-Based Reverse Geocoding

Figure 3A:
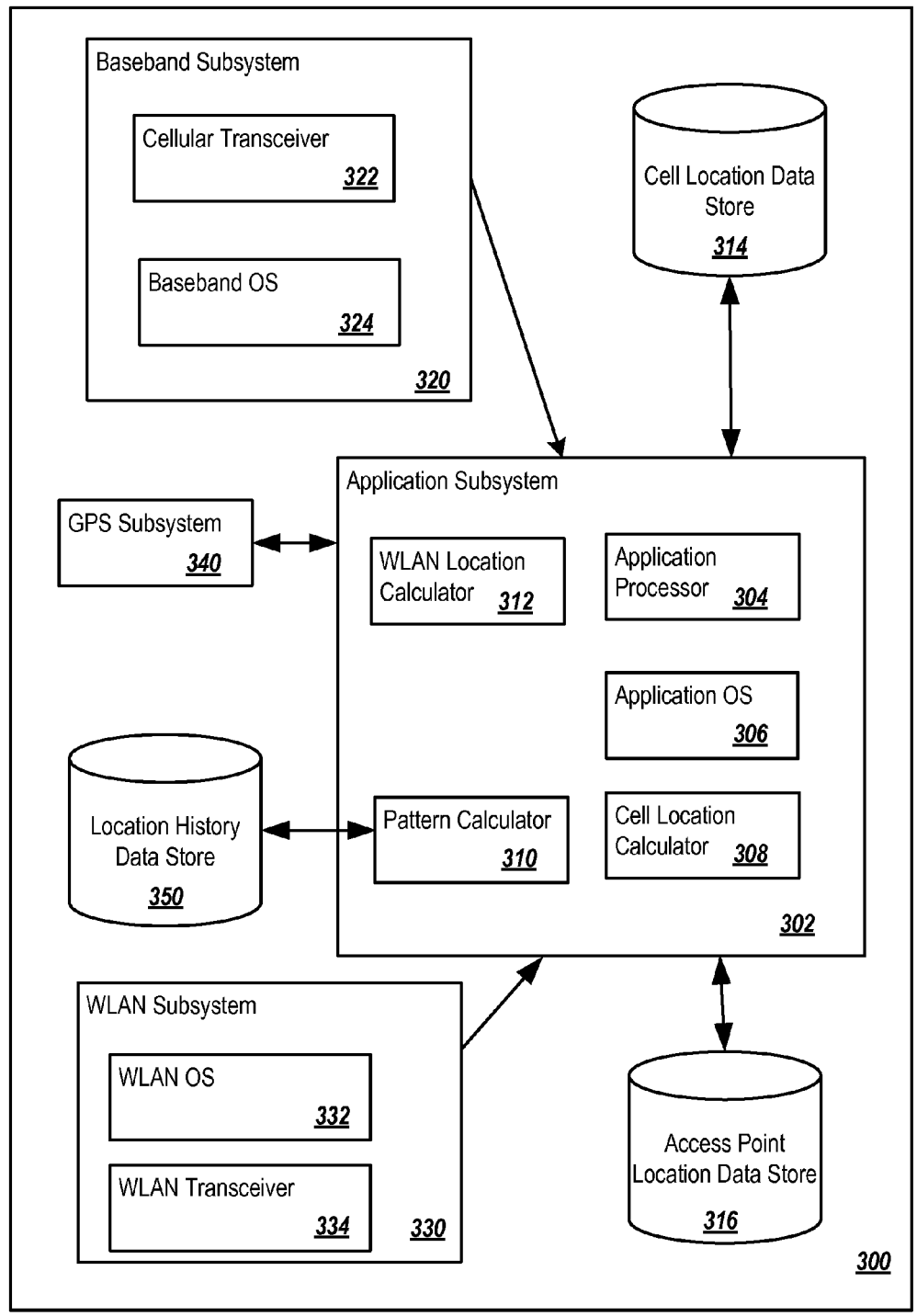
FIG. 3A is a block diagram illustrating subsystems of an exemplary mobile device implementing techniques of context-based reverse geocoding.

FIG. 3A is a block diagram illustrating subsystems of exemplary mobile device 300 implementing techniques of context-based reverse geocoding. Mobile device 300 can be a mobile device such as mobile device 100 of FIG. 1. Mobile device 300 can include application subsystem 302, baseband subsystem 320, wireless local area network (WLAN) subsystem 330, and GPS subsystem 340. Application subsystem 302 can be configured to perform traditional computer functions, such as executing application programs, storing various data, and displaying digital images. Application subsystem 302 can include application processor 304 and application operating system 306. Baseband subsystem 320 and WLAN subsystem 330 can be used additional to or as alternatives of GPS subsystem 340 for determining a current location of mobile device 300.

Baseband subsystem 320 can include a baseband processor, cellular transceiver 322, and baseband operating system 324 that manages various functions of baseband subsystem 320. Baseband subsystem 320 can be configured to monitor a current cell ID. Monitoring a current cell ID can include detecting that a current cell ID has changed. Baseband subsystem 320 can notify application subsystem 320 when a current cell ID changes. Baseband subsystem 320 can be configured to submit the current cell ID to application subsystem 302 upon receiving a request from application subsystem 302.

When application subsystem 302 receives the current cell ID from baseband subsystem 320, application subsystem 302 can determine a cell location using cell location calculator 308. A cell location can be a location calculated statistically based on usage information, e.g., location mobile devices that are, or have been, connected to a cell tower. A cell location need not correspond precisely to a size or shape of an actual cell. Cell location calculator 308 can query cell location data store 314 using the received current cell ID and retrieve a cell location associated with the received current cell ID. Cell location data store 314 can store cell locations, associating cell IDs. Cell location data store 314 can reside on mobile device 300, reside on a server remotely, or be distributed among various mobile devices and servers.

If cell location calculator 308 fails to retrieve a cell location corresponding to the received current cell ID, cell location calculator 308 can request an update from a remote server through a communications network using a cell information update request. The request can include the received current cell ID, and can be made through data communication functions of baseband subsystem 320 or data communication functions of WLAN subsystem 330. If the server fails to respond, or the response fails to identify a cell location corresponding to the received current cell ID, mobile device 300 can determine a current location using a WLAN location. A WLAN location can be a location determined by triangulating a location of various wireless access points in a WLAN.

WLAN subsystem 330 can include a WLAN processor, wireless transceiver 334, and WLAN operating system 332 that manages various functions of WLAN subsystem 330. WLAN subsystem 330 can be configured to scan wireless communication channels to detect access points that are located within a communication range of mobile device 300. Detecting the access points can include detecting media access control (MAC) addresses associated with the access points. WLAN subsystem 330 can be configured to submit the detected MAC addresses to application subsystem 302 upon receiving a request from application subsystem 302.

When application subsystem 302 receives the MAC addresses from WLAN subsystem 330, application subsystem 302 can determine a WLAN location using WLAN location calculator 312. WLAN location calculator 312 can query access point location data store 316 using the received MAC addresses, and retrieve one or more access point locations. Access point location data store 316 can store access point locations associated with the MAC addresses. Access point location data store 316 can reside on mobile device 300, reside on a server remotely, or be distributed among various mobile devices and servers.

If WLAN location calculator 312 fails to retrieve an access point location corresponding to a MAC address, WLAN location calculator 312 can request an update from a remote server through a communications network using an access point information update request. The request can include the received MAC addresses, and can be made through data communication functions of baseband subsystem 320 or data communication functions of WLAN subsystem 330.

WLAN location calculator 312 can determine a WLAN location of mobile device 300 using the access point locations retrieved from access point location data store 316. Determining the WLAN location can include triangulating the WLAN location from the access point locations. Alternatively or additionally, WLAN location calculator 312 can determine the WLAN location of mobile device 300 using an iterative process that triangulates a most likely location. Mobile device 300 can determine a current location using a tiered approach. For example, mobile device 300 can attempt to determine a current location using a GPS subsystem 340. If a location cannot be determined (e.g., due to poor quality of GPS signal), mobile device 300 can attempt to determine the current location using WLAN subsystem 330. If no wireless access points for triangulation are detectable, mobile device 300 can attempt to determine the current location using baseband subsystem 320. Mobile device 300 can determine the current location using a combination of GPS subsystem 340, WLAN subsystem 330, and baseband subsystem 320. A horizontal accuracy of latitude and longitude coordinates using one subsystem (e.g., GPS subsystem 340) can be weighed differently from that of a location determined by another subsystem (e.g., baseband subsystem 320).

Application subsystem can include pattern calculator 310. Pattern calculator 310 can be used to determine a pattern of movement of mobile device 300. Mobile device 300 can poll current locations of mobile device 300 periodically, based on one or more of cell ID tracking, wireless access point positioning (e.g., by triangulating wireless assess points), and GPS. The polling can be performed at variable intervals. The intervals can vary based on a current speed of mobile device 300. For example, the interval (e.g., time period until a next poll) can be inversely proportional to the speed at which mobile device 300 travels. In some implementations, the speed can be determined using the distance traveled during last n polls (e.g., the last two polls) and the time that elapsed between the last n polls. The interval can have a lower limit (e.g., ten minutes) that determines a maximum frequency of the polling (e.g., polls at most every ten minutes). The locations polled (including latitude and longitude coordinates) as well as the current speed can be stored in location history data store 350 for calculation in a next poll. Travel direction can also be determined using the locations stored in location history data store 350. Pattern calculator can also calculate a movement consistency based on the stored locations. Movement consistency can be used to measure a frequency of speed change. If mobile device 300 changes speed at a rate that exceeds a threshold, the change can indicate mobile device 300 has arrived at a destination or has departed a particular place. Mobile device 300 can select a geofence that is different from a current geofence in response.

Figure 3B:
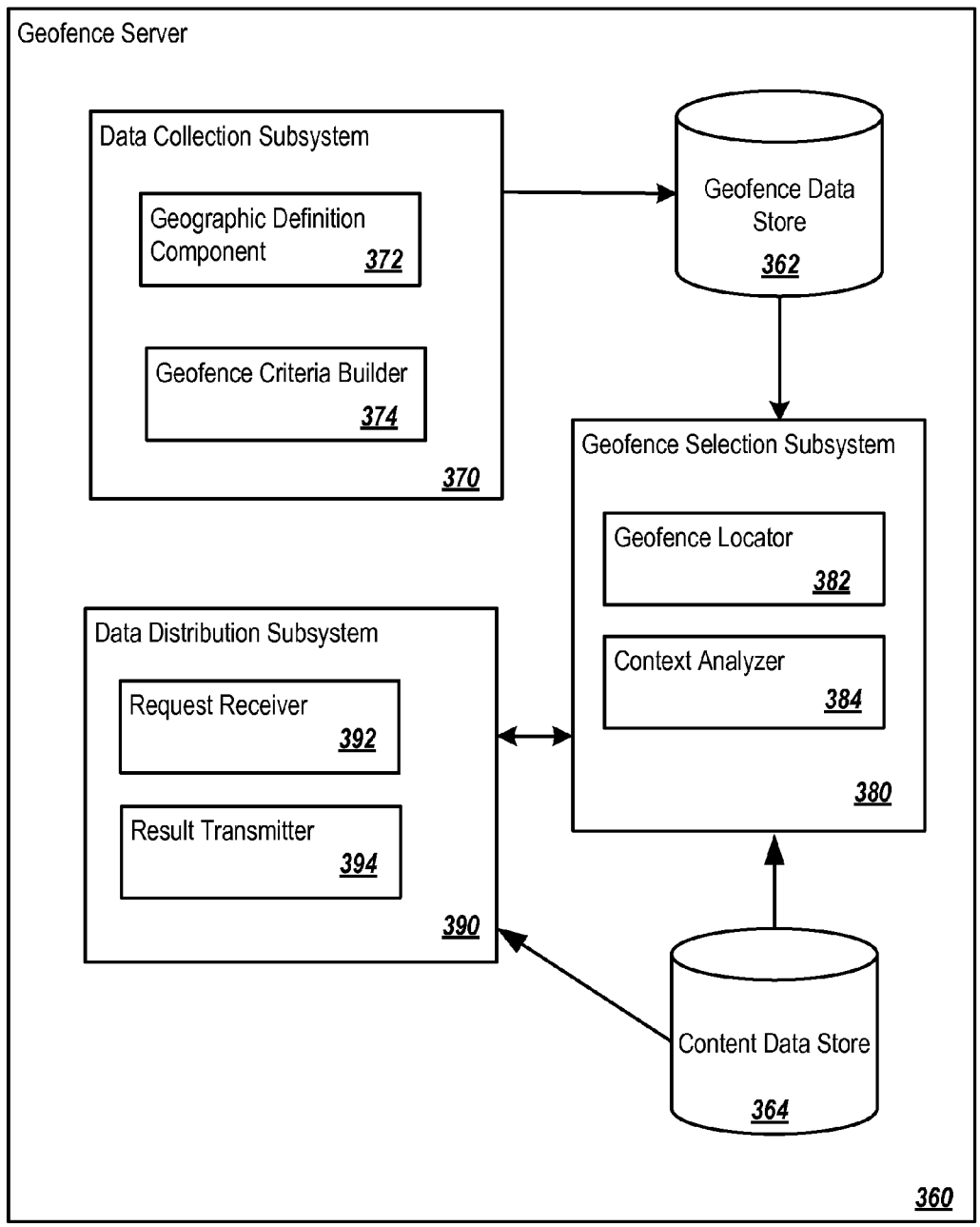
FIG. 3B is a block diagram illustrating subsystems of an exemplary server implementing techniques of context-based reverse geocoding.

FIG. 3B is a block diagram illustrating subsystems of exemplary server 360 implementing techniques of context-based reverse geocoding. Server 360 can include one or more processors, and one or more storage devices that can store instructions for performing context-based reverse geocoding. Server 360 can include, or be connected to, geofence data store 362. In some implementations, geofence data store 362 can be distributed among multiple servers or between server 360 and mobile devices. For example, mobile device 300 of FIG. 3A can store a portion of data geofence data store 362.

Geofence data store 362 can store one or more geofences, including geometry of the geofences (e.g., the vertices) and selection criteria of the geofences. The selection criteria can include conditions for allowing a mobile device to virtually enter or exit areas enclosed by the geofences. The selection criteria can include, for example, a traveling speed or a range of traveling speeds, a traveling direction, a consistency of movement, one or more last known locations, etc. The selection criteria can be matched against a pattern of movement of the mobile device for determining whether the mobile device can enter the geofence.

Server 360 can include data collection subsystem 370. Data collection subsystem 370 can be used to populate geofence data store 362. Data collection subsystem 370 can include geographic definition component 372 that can be used to specify geometry of the geofences of geofence data store 362. For example, geographic definition component 372 can receive, from one or more mobile devices, a user defined geofence or an automatically defined. The geofence can be any closed geometric shape (e.g., a circle, an ellipse, a polygon, or a free-style shape) that is drawn by the user.

Data collection subsystem 370 can include geofence criteria builder 374. Geofence criteria builder 374 can be used to define selection criteria associated with the geofence. The selection criteria can be specified by a user. For example, based on a user input, geofence criteria builder 374 can specify that only mobile devices that have entered a first geofenced area (e.g., a registration area) in a particular time period (e.g., less than an hour ago) are allowed to enter a second geofenced area (e.g., a conference room) where the mobile devices can receive specific content related to the second geofence (e.g., a meeting agenda). Mobile devices that have not entered the first geofenced area, although physically present in the geographic area enclosed by the second geofence, can be virtually denied entry into the second geofenced area and denied the content. The selection criteria can include requirements that a mobile device needs to travel a trajectory (e.g., to cross a series of first geofences in sequence) before being allowed to enter the second geofence.

In some implementations, geofence criteria builder 374 can attach selection criteria to a geofence based on historical data received from one or more mobile devices. Server 360 can receive multiple locations and contexts including patterns of movement of the mobile devices. The patterns of movement can be attached to a particular geofence when the patterns are frequently present when the mobile devices are in the geofence. For example, if most mobile devices in a particular geofence associated with a street travel between 35 mph and 50 mph, bearing either 90 degrees (east) or 270 degrees (west), the speeds 35 mph and 50 mph and the bearings 90 and 270 degrees can be added as selection criteria for the particular geofence.

Server 360 can include data distribution subsystem 390. Date distribution subsystem 390 can include request receiver 392 that can include hardware and software for receiving a request from a mobile device. The request can be passed to geofence selection subsystem 380. Geofence selection subsystem 380 can include geofence locator 382. Geofence locator 382 can retrieve one or more geofences from geofence data store 362 based on location. When no other context information are available, geofence locator 382 can select one or more retrieved geofences to send to the requesting mobile device based on specified default selection criteria (e.g., popularity of the geofences).

Geofence selection subsystem 380 can include context analyzer 384. When context information (e.g., a pattern of movement) is associated with a request, context analyzer 384 can analyze the received context, including comparing the pattern to the selection criteria of the geofences retrieved by the geofence locator 382. Context analyzer 384 can select one or more geofences based on the comparison.

Server 360 can include, or be connected to, content data store 364. Content data store 364 can store content that is related to the geofences. In some implementations, the content can be generated dynamically by server 360 or by other content-generating sources. The content related to the selected geofence can be provided to the requesting mobile device using result transmitter 394 of data distribution subsystem 390.

Figure 4:
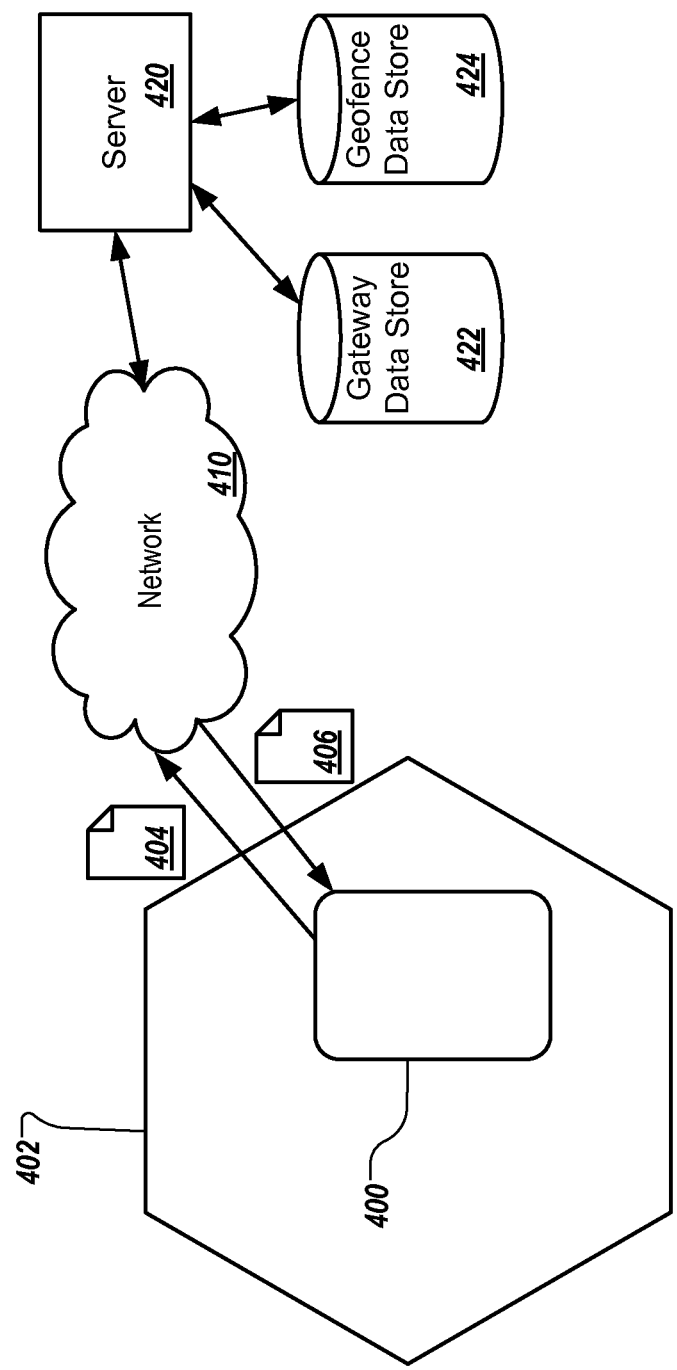
FIG. 4 illustrates an exemplary interaction between a mobile device and a server.

FIG. 4 illustrates an exemplary interaction between mobile device 400 and server 420. Server 420 can be a server such as server 360 of FIG. 3B. Mobile device 400 can be a mobile device such as mobile device 100 of FIG. 1. Mobile device 400 can request an update of location identifiers (e.g., cell IDs or MAC addresses of wireless access points) stored in cell location data store 314 or access point location data store 316. The request can be sent to server 420 when mobile device 400 is located in a place (e.g., cell 402) whose location mobile device 400 does not know.

Mobile device 400 can transmit request 404 to a server 420 through network 410 to request location identifiers that include a location identifier (e.g., a current cell ID) of a current wireless communications gateway (e.g., a cell tower). Request 404 can include current location information as well as the type of location identifiers requested. The current location information can include, for example, one or more of current cell ID, current location area code (LAC), current mobile network code (MNC), and current mobile country code (MCC). The type of location identifiers can include identifying whether mobile device 400 seeks identifiers of wireless access points, cell IDs, LACs, MNCs, or MCCs.

Upon receiving request 404, server 420 can identify one or more location identifiers from gateway data store 422 to be transmitted to mobile device 400. Identifying the location identifiers from gateway data store 422 can include, for example, identifying some or all cell IDs corresponding to the LAC or MCC in request 404. The identified location identifiers, as well as locations associated with the location identifiers, can be transmitted to mobile device 400 in response 406.

Mobile device 400 can retrieve an identifier of a geofence and information related to the geofence from server 420 using request 404. Request 404 can include a current location of mobile device 400. The current location can include latitude, longitude, and optionally, altitude coordinates, as wall as horizontal accuracy (e.g., an error margin of the latitude and longitude) and vertical accuracy (e.g., an error margin of the altitude). Request 404 can include context of the current location (e.g., a pattern of movement of mobile device 400).

Upon receiving the current location and context of the current location from mobile device 400, server 420 can identify one or more geofences from geofence data store 424. Identifying the geofences from geofence data store 424 can include a multi-stage process. Server 420 can retrieve all geofences in which mobile device 400 can possibly be located based on the latitude, longitude, and optionally, altitude coordinates. Server 420 can filter the retrieved geofences based on the horizontal accuracy and vertical accuracy. Server 420 can further select one or more geofences from the filtered geofences as current geofences of mobile device 400 based on the context.

Geofence data store 424 can store various specifications of the geofences. The specifications can include coordinates of the vertices of the polygons that constitute the geofences, selection criteria of the geofences that can be matched to a pattern or movement of a mobile device or used to exclude a pattern or movement of a mobile device, as well as content related to the geofence or references to content that is related to the geofence. The specifications of the geofences can be configured by one or more users. Server 420 can provide to mobile device 400, in response 406, content that is related to a geofence that has been selected. In some implementations, geofence data store 424 can be stored in a distributed system that includes one or more server computers and one or more mobile devices. At least a portion of geofence data store 424 can be stored on mobile device 400.

Exemplary Data Structures Used in Context-Based Reverse Geocoding

Figure 5A:
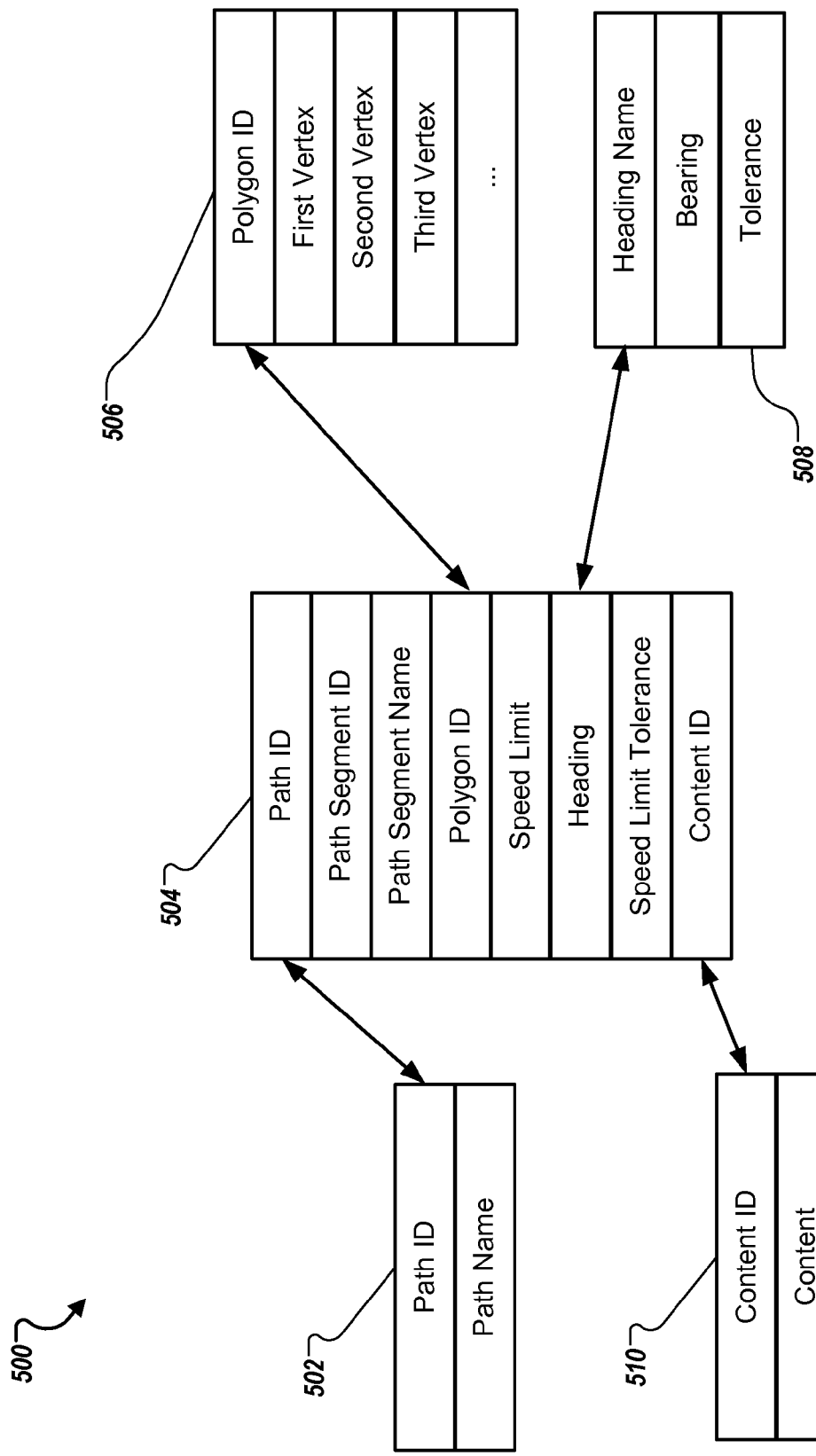
FIGS. 5A and 5B illustrate exemplary data structures used in context-based reverse geocoding.
Figure 5B:
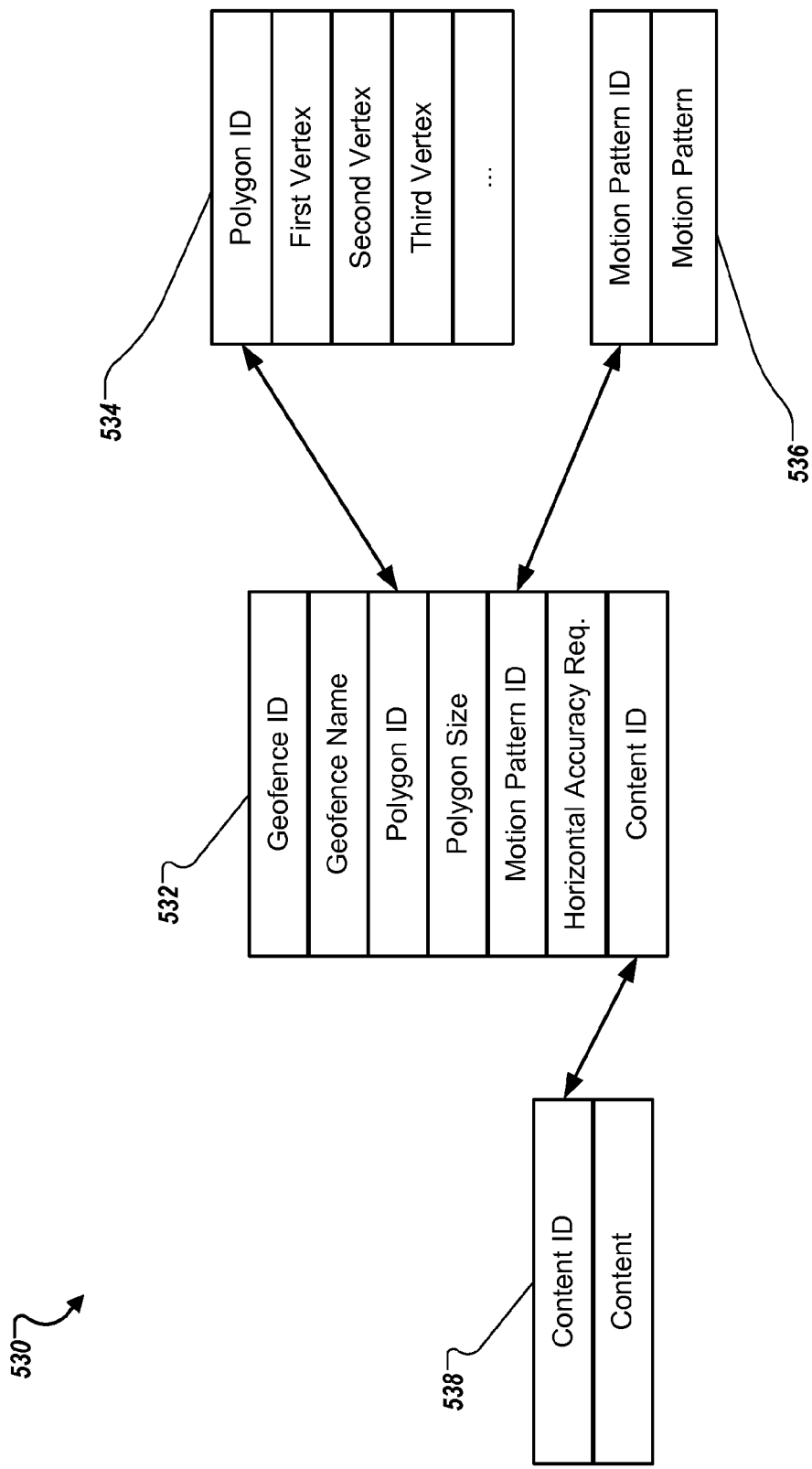

FIGS. 5A and 5B illustrate exemplary data structures used in context-based reverse geocoding. For convenience, the data structures will be described in reference to a relational database using terms such as tables, data fields and keys. The data structures described in FIGS. 5A and 5B can be implemented using any technology, for example, a relational database, an object-oriented database, an R-tree data structure serialized as flat file, etc.

FIG. 5A illustrates exemplary data structure 500 that can be used to store geofences whose specifications include speed requirements. Table 502 can be a path table that includes a name (e.g., "Hwy 101") of a path (e.g., a freeway), which can include one or more segments. Path table 502 can be linked to path segment table 504 using key "path ID." Path segment table 504 can store segments of a path (e.g., a section of Highway 101). A segment of a path can correspond to a geofence that includes one or more polygons. Path segment table 504 can be linked to polygon table 506 through a polygon identifier (polygon ID). Polygon table 506 can store vertices of one or more polygons that constitute the geofence. Path segment table 504 can be linked to headings table 508 through key "heading." Heading table 508 can include one or more bearings or travel directions permitted on the path segment at which movements are permitted (e.g., 45 degrees from north). A bearing can have a tolerance (e.g., plus or minus 10 degrees). The tolerance can be specific to the path segment.

Path segment table 504 can include data fields that contain other information related to each path segment. Some examples of these data fields can be path segment name (e.g., "Bay Shore Freeway South" for a section of "Hwy 101"), a speed limit (e.g., 65 mph), a speed limit tolerance that can specify a range of speed within which range a speed-based geofence determination can be made. For example, a speed limit tolerance for "Bay Shore Freeway" can specify that a selection criterion is satisfied if a speed of the mobile device is between 45 mph and 150 mph. If a mobile device travels below 45 mph, the mobile device can be traveling on a surface street. If a mobile device travels above 150 mph, the mobile device can be traveling in an airplane whose path coincide with "Hwy 101." In these situations, other pattern of movement can be used to determine whether the mobile device is located in the geofence. Path segment table 504 can be linked to content table using a content identifier (content ID). The content table can include static or dynamic content to be delivered to a mobile device if the mobile device is located in a geofence that encloses the path segment of path segment table 504.

FIG. 5B illustrates exemplary data structure 530 that can be used to store geofences. Geofence table 530 can store specifications of one or more geofences. A geofence can include one or more polygons. The polygons can be stored in polygon table 534. The polygon table can be linked to geofence table 530 using a polygon ID. A geofence can include multiple discrete polygons. For example, a geofence can specify "city parks" which can include multiple polygons each enclosing a separate city park. A geofence can be a polygon that includes one or more holes. For example, a geofence can specify "Mountain Time Zone" which can include the Mountain Time Zone states of the United States, with a hole that corresponds to Navajo Nation (in Arizona) carved out. Polygon table 534 can store the multiple polygons as positive polygons or negative polygons (e.g., the holes) and distinguish the negative polygons, for example, by storing the vertices clockwise or counter clockwise.

Geofence table 530 can include a polygon size data field, which can store a size of the geographic area enclosed by the geofence. The size can be calculated from the polygon or polygons stored in polygon table 534. The size can be used to compare with a size of a location (including horizontal accuracy) of a mobile device. In some implementations, a geofence is selected if the size of the geofence is in a same size category as the size of the location. A size category can include a range of sizes that are in the same magnitude. For example, a first size category can be one to 1000 square meters; a second size category can be 1000 square meter to one square kilometer, etc.

Geofence table 530 can include a motion pattern ID that links to motion pattern table 536. Motion pattern table 536 can store data that describes what motion pattern can fit geofence 532. The motion pattern can include speed, direction, trajectory, and consistency. In some implementations, the motion pattern can include a trajectory. The trajectory can include a previous location of the mobile device. Mobile devices coming to a particular geographic region from different places can enter different but overlapping geofences. For example, an "inbound international flight connection at SFO" geofence corresponding to San Francisco International Airport (SFO) can have a selection criterion specifying that only a mobile device whose last known location is outside of the United States can enter the geofence. An "outbound international flight connection at SFO" may not have such a selection criterion.

Geofence table 530 can be linked to content table 538 through a content ID data field. Content table 538 can store content or reference to content that can be provided to a mobile device that is inside the geofence. The content can include, for example, economic information related to the geographic feature enclosed by the geofence, population of a defined area (e.g., in a postal code, a congressional district, or a township) enclosed by the geofence, historical data, time zone, etc.

Exemplary Processes of Context-Based Reverse Geocoding

Figure 6A:
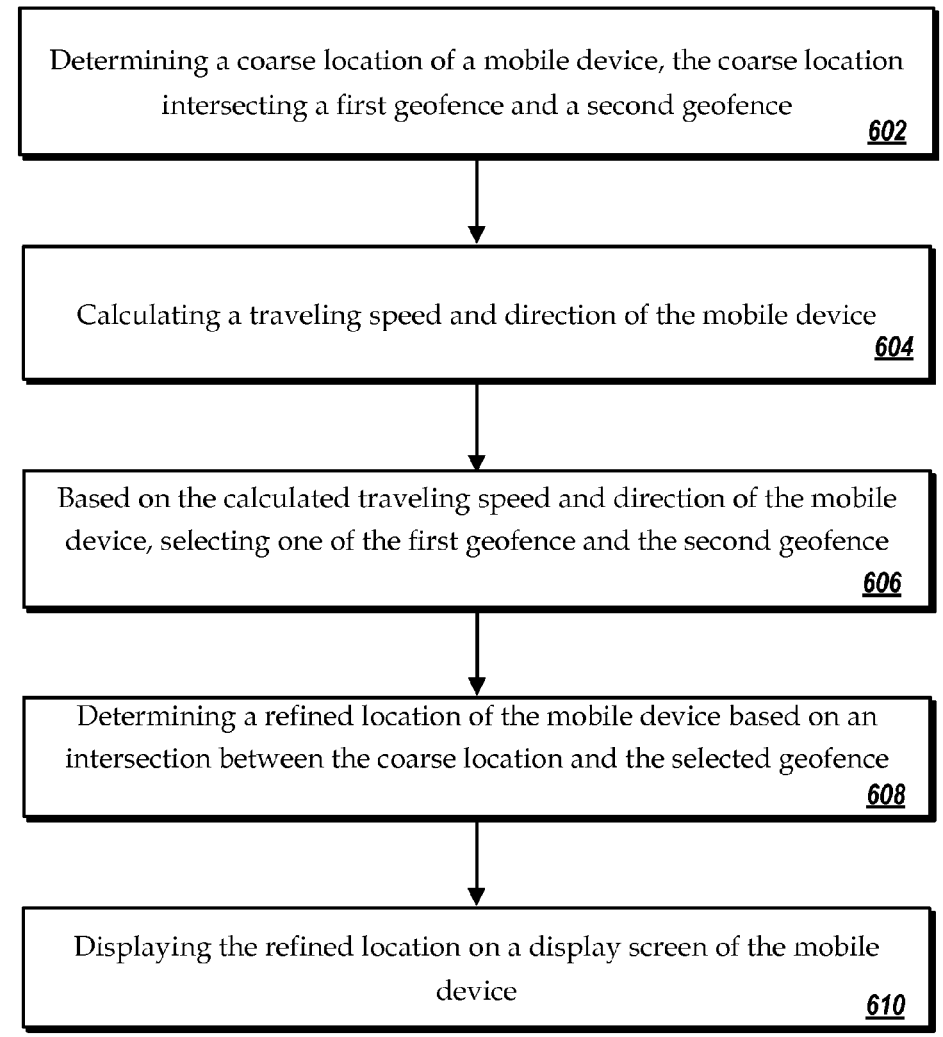
FIGS. 6A-6C are flowcharts illustrating exemplary processes of context-based reverse geocoding.
Figure 6B:
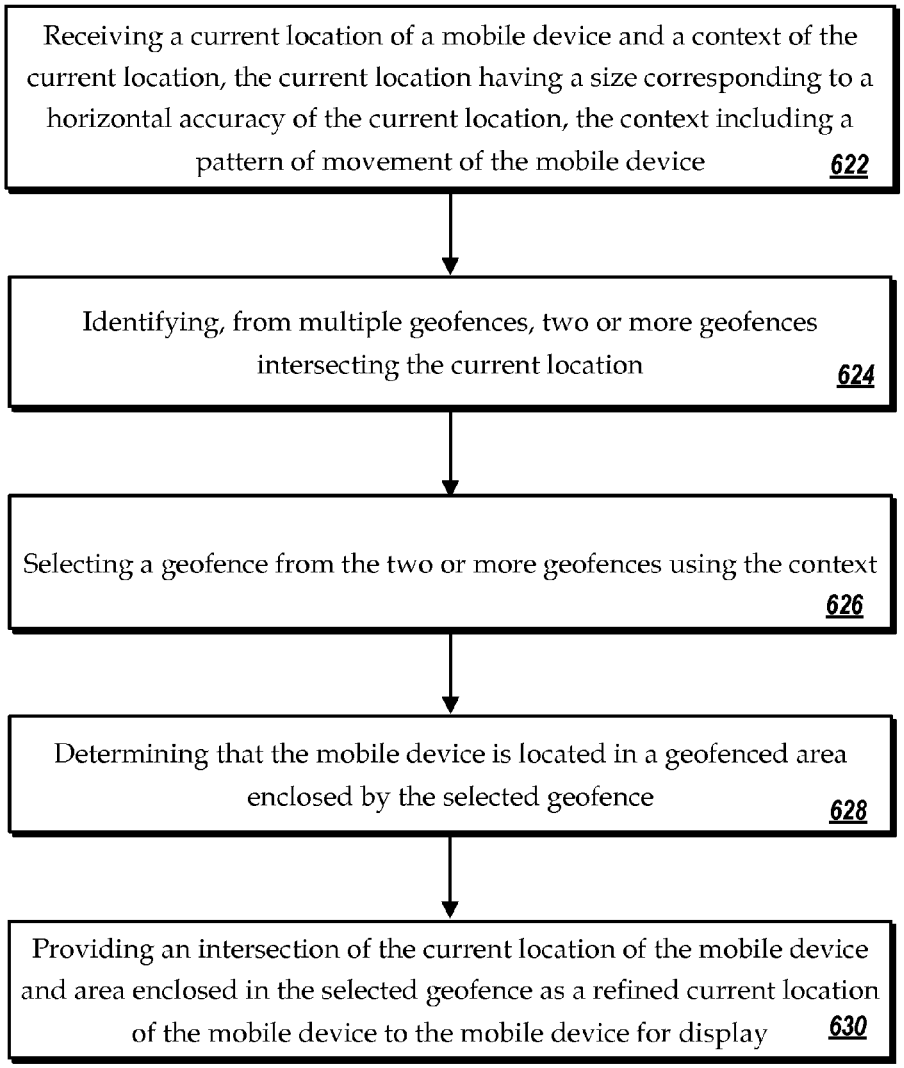
Figure 6C:
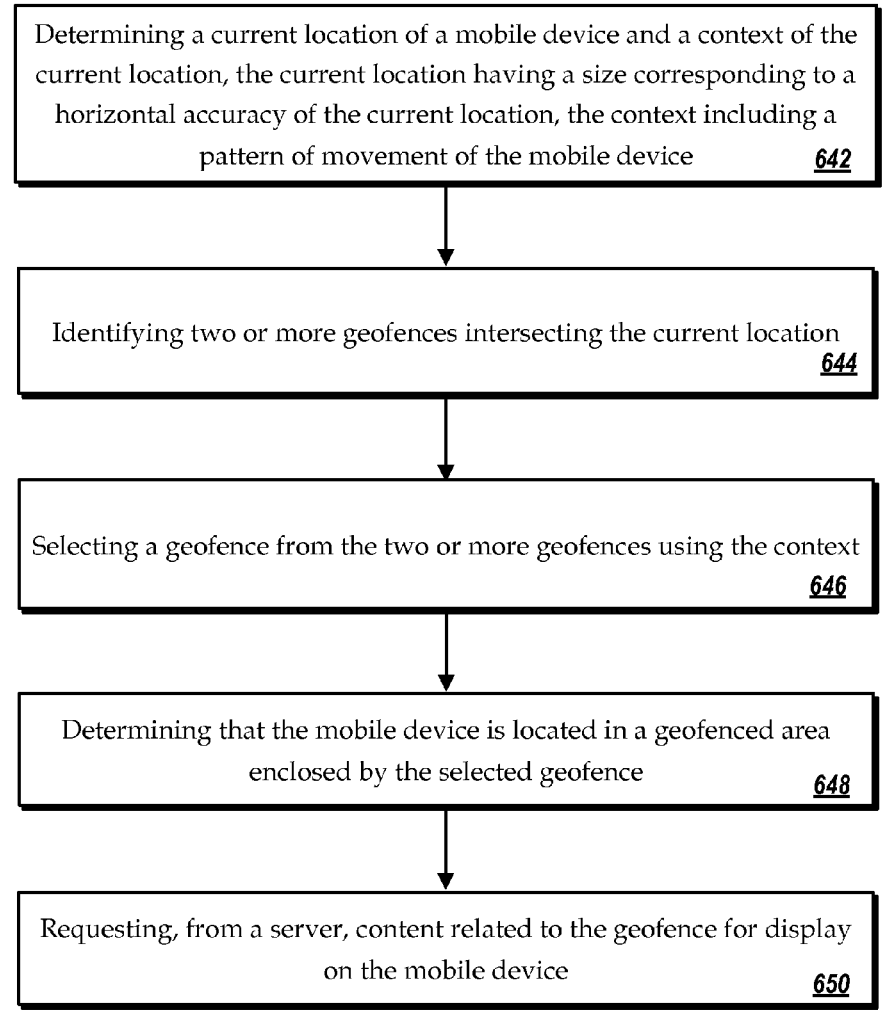

FIGS. 6A-6C are flowcharts illustrating exemplary processes of context-based reverse geocoding. FIG. 6A is a flowchart illustrating exemplary process 600 of context-based reverse geocoding. Process 600 can be executed on a mobile device (e.g., mobile device 100 of FIG. 1).

The mobile device can determine (602) a first location (e.g., a coarse location) of the mobile device. The coarse location can be determined using GPS, triangulation of wireless access points, or triangulation of cell towers of a cellular communications network. The coarse location can be represented as a circle having a center and a radius. The center can be defined by coordinates that include a latitude, a longitude, and optionally an altitude. The radius can correspond to a horizontal accuracy of the coarse location. The circle can intersect a first geofence and a second geofence. The first geofence can correspond to an interstate highway. The second geofence can correspond to a frontage road that is located in proximity with and runs parallel to the interstate highway.

The mobile device can calculate (604) a traveling speed and direction of the mobile device. Based on the calculated traveling speed and direction, the mobile device can select (606) one of the first geofence and the second geofence. If the calculated traveling speed satisfies a threshold speed specified in a selection criterion associated with first geofence that corresponds to the interstate highway, the mobile device can select the first geofence. Otherwise, the mobile device can select the second geofence. The mobile device can determine (608) a second location (e.g., a refined location) of the mobile device based on an intersection between the coarse location and the selected geofence. The mobile device can display (610) the second location on a display screen of the mobile device.

FIG. 6B is a flowchart illustrating exemplary process 620 of context-based reverse geocoding. Process 620 can be executed on a server (e.g., server 360 of FIG. 3B).

The server can receive (622) a current location of a mobile device and a context of the current location. The current location of the mobile device can include a latitude, a longitude, and optionally, an altitude of the mobile device. The current location can be a point defined by the latitude, longitude, and altitude, an area including the point and having a size corresponding to an accuracy (e.g., a horizontal accuracy) of the current location, or a space including the point and having a size corresponding to a horizontal accuracy and a vertical accuracy of the current location. The accuracy (horizontal accuracy or vertical accuracy) can be determined by the mobile device when the mobile device calculates the current location, or by the server based on characteristics of a technology used for determining the current location. The context can include an identifier of the technology used (e.g., GPS, WLAN triangulation, or cell triangulation). The server can specify an accuracy for each of the technologies. For example, an accuracy specified for GPS technology can include a 30-meter horizontal accuracy and a 30-meter vertical accuracy. An accuracy specified for cell triangulation technology can include a one kilometer horizontal accuracy and infinite vertical accuracy. The value of an accuracy for a technology can measure the least amount of error obtainable using the technology.

The geofence of stage 622 can include one or more polygons or curved shapes (e.g., circles or ellipses). The geofence can be associated with various functions that can be performed on a mobile device if the mobile device is located inside the geofence. For example, an application program can be associated with a geofence. If a mobile device enters the geofence, the application program can be invoked or notified on the mobile device. In some implementations, the geofence can include vertices of a three-dimensional space. For example, the geofences can include eight vertices of a rectangular prism that encloses one or more floors of a building.

The context received in stage 622 can include a pattern of movement of the mobile device. The pattern of movement can include at least one of a speed of movement of the mobile device, a trajectory of the mobile device, and a moving direction of the mobile device. The trajectory of the mobile device can include a series of one or more geofences that the mobile device has visited previously, or a series of locations that the mobile device has visited previously. The trajectory can include time information associated with the visited geofences. The trajectory can include one or more geofences that, based on the current travel speed and direction, the mobile device is projected to visit within a threshold of time.

The server can identify (624), from multiple geofences, two or more geofences intersecting the current location. Identifying the geofences can include determining that the two or more geofences intersect the current location using various clipping algorithms. Some example clipping algorithms include Weiler-Atherton clipping algorithm and Sutherland-Hodgman clipping algorithm.

The server can select (626) a geofence from the two or more geofences using the context. Selecting the geofence using the context can include comparing the pattern of movement in the context with one or more selection criteria of the two or more geofences. Selecting the geofence using the context can include matching a pattern of movement of the mobile device with historical patterns of movements of various mobile devices that have been associated with the geofence as selection criteria. The server can identify one or more historical movement patterns of mobile devices in each of the two or more geofences. The server can calculate match scores measuring matches between the historical movement patterns to the pattern of movement of the mobile device in the context, and select a geofence based on the match scores. For example, the server can select a geofence that has the highest match score. Selecting the geofence from the two or more geofences using the context can denying virtual entry of the mobile device into a geofence having a specified selection criterion when the mobile device is physically located in a geographic area enclosed by the geofence having the specified selection criterion when the pattern of movement in the context fails to meet the specified selection criterion.

In some implementations, selecting the geofence in stage 626 can include selecting a geofence based on fence size and the pattern of movement of the mobile device. The server can identify a fence size for each of the two or more geofences. The fence size of a geofence can be an area of a geographic location enclosed in the geofence. The server can calculate match scores measuring matches between the fence sizes and the pattern of movement of the mobile device. The server can select the geofence based on the match scores. For example, the server can specify a fence size that is proportional to a traveling speed of the mobile device, and select a geofence whose fence size is closest to the specified fence size. Thus, the faster a mobile device travels, the larger the selected geofence.

The server can determine (628) that the mobile device is located in a geofenced area enclosed by the selected geofence. In some implementations, each of the two or more geofences can be associated with an address. Determining that the mobile device is located in the geofenced area enclosed by the selected geofence can include determining that the mobile device is located at the address associated with the geofence. The address can be a neighborhood name, a street name, a landmark name (e.g., a name of a mountain), a postal code, a political district, or a business address of a commercial entity.

The server can provide (630) an intersection of the current location of the mobile device and the geofenced area enclosed in the selected geofence as a refined current location of the mobile device to the mobile device for display. The server can provide content related to the selected geofence to the mobile device.

FIG. 6C is a flowchart illustrating exemplary process 640 of context-based reverse geocoding. Process 640 can be executed on a mobile device (e.g., mobile device 100 of FIG. 1).

The mobile device can determine (642) a current location of the mobile device and a context of the current location. The current location can have a size corresponding to an accuracy of the current location. The context can include a pattern of movement of the mobile device and a horizontal accuracy of the current location.

The mobile device can identify (644) two or more geofences intersecting the current location. Identifying the two or more geofences intersecting the current location can include identifying the two or more geofences from multiple geofences stored in a geofence data store that is included in or connected to the mobile device. The multiple geofences can be received from a server.

The mobile device can select (646) a geofence from the two or more geofences using the context. Selecting the geofence can include analyzing the pattern of movement of the mobile device and determining whether the pattern of movement of the mobile device satisfies a selection criterion of the geofence. Selecting the geofence can include selecting the geofence based on the horizontal accuracy of the current location. The horizontal accuracy can be determined using various technologies. The technologies can include a GPS, triangulation using locations of wireless access points of a WLAN, and triangulation using locations of cell towers of a cellular communications network. Each technology can be associated with a specified horizontal accuracy. For example, a technology can be associated with a coarse, medium, or fine accuracy, each accuracy corresponding to a value (e.g., measured in meters). The accuracy can be the selection criterion of the geofence. Selecting the geofence can include selecting the geofence based on a combination of the horizontal accuracy of the current location and the pattern of movement of the mobile device.

The mobile device can determine (648) that the mobile device is located inside the selected geofence. The mobile device can request (650), from a server, content related to the geofence for display on the mobile device.

Exemplary Mobile Device Architecture

Figure 7:
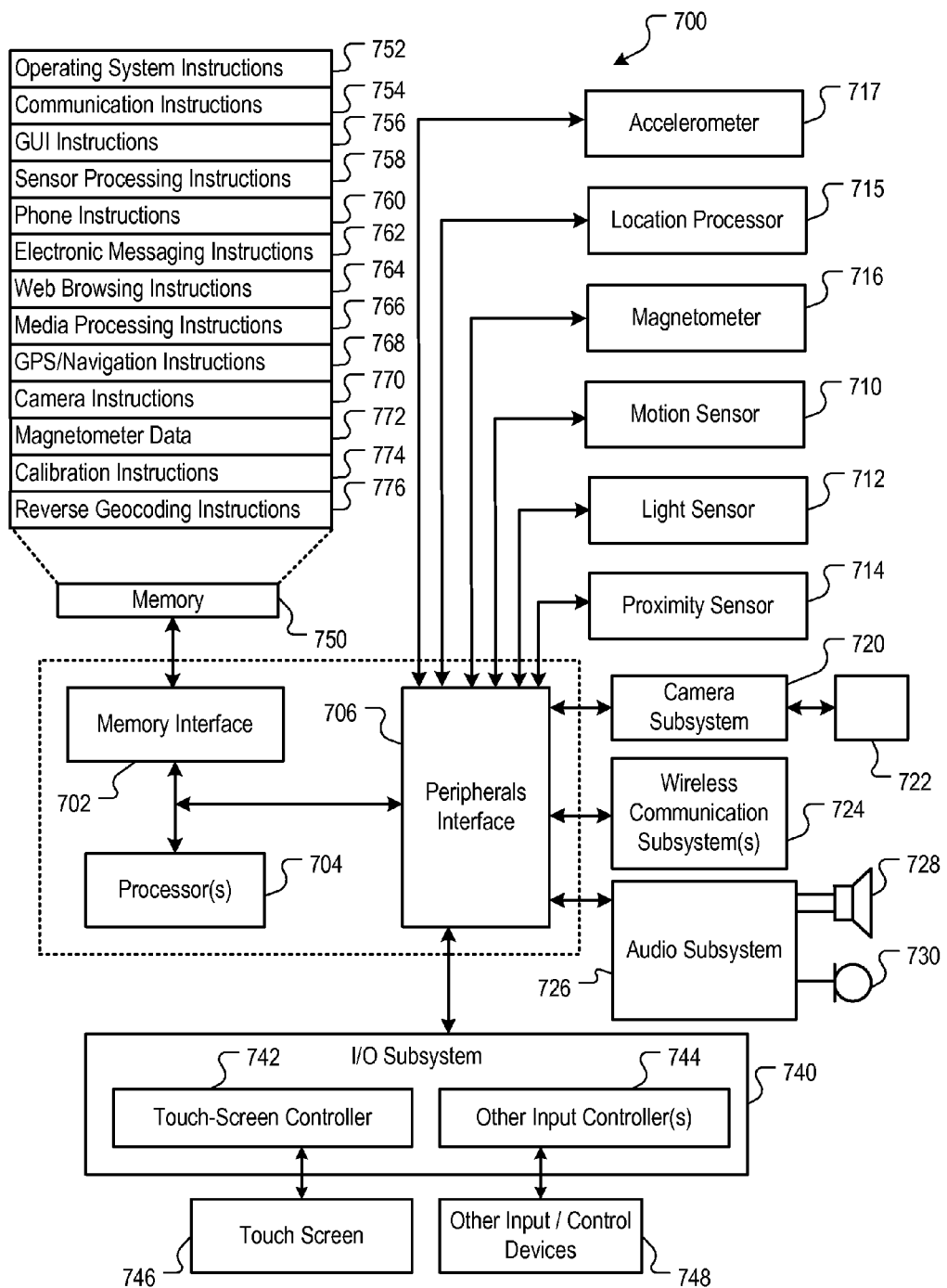
FIG. 7 is a block diagram illustrating an exemplary device architecture of a mobile device implementing the features and operations of context-based reverse geocoding.

FIG. 7 is a block diagram of an exemplary architecture 700 for a mobile device implementing the features and operations of context-based reverse geocoding. A mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors (APs) and baseband processors (BPs). The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communications network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™ Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include reverse geocoding instructions 776 that can be used to determine a current location of mobile device 100, determine a context of the current location, submitting the current location and the context to a server to request geofence information or determining locally a geofence in which mobile device 100 is located.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
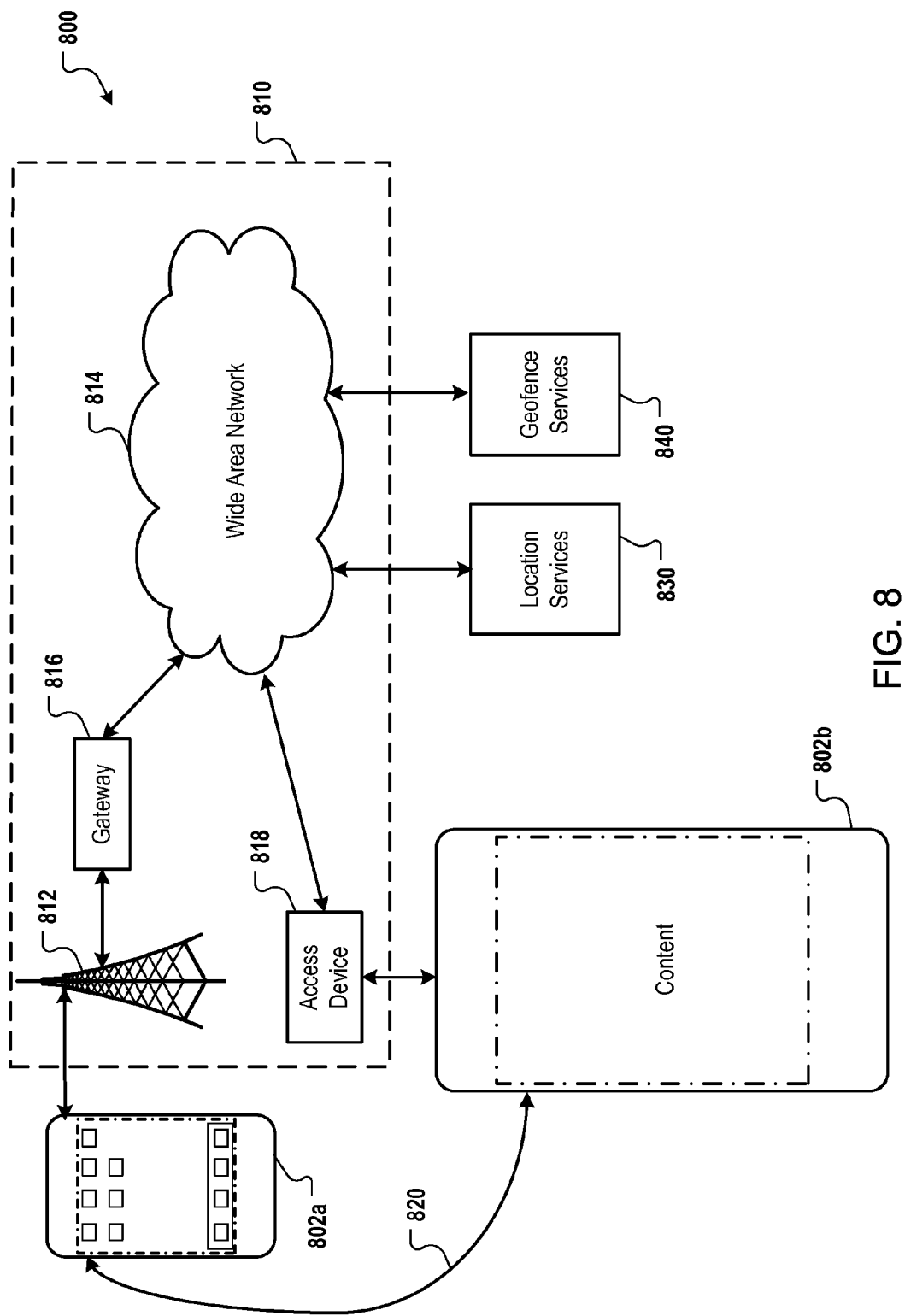
FIG. 8 is a block diagram of an exemplary network operating environment for the mobile devices implementing features and operations of context-based reverse geocoding.

FIG. 8 is a block diagram of an exemplary network operating environment 800 for mobile devices implementing the features and operations of context-based reverse geocoding. Mobile devices 802*a* and 802*b* can be mobile device such as mobile device 100 of FIG. 1. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more location services 830 can determine one or more location identifiers of wireless access gateways (cell towers or wireless access points) and latitude and longitude coordinates associated with the location identifiers, and provide the one or more location identifiers to mobile devices 802a and 802b for determining current locations mobile devices 802a and 802b using the location identifiers. One or more geofence services 840 can receive a request from a mobile device, and use the location information and context of the location information to select one or more geofences for mobile devices 802a and 802b. The geofence services 840 can provide content related to the selected geofences to mobile devices 802a and 802b.

Geofence services 840 can, for example, provide user interface for users to create and configure geofences, select geofences for mobile devices 802a and 802b based on locations of mobile devices 802a and 802b and contexts of the locations, and provide content related to the selected geofences to mobile devices 802a and 802b.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

Exemplary Architecture of a Server for
Context-Based Reverse Geocoding

Figure 9:
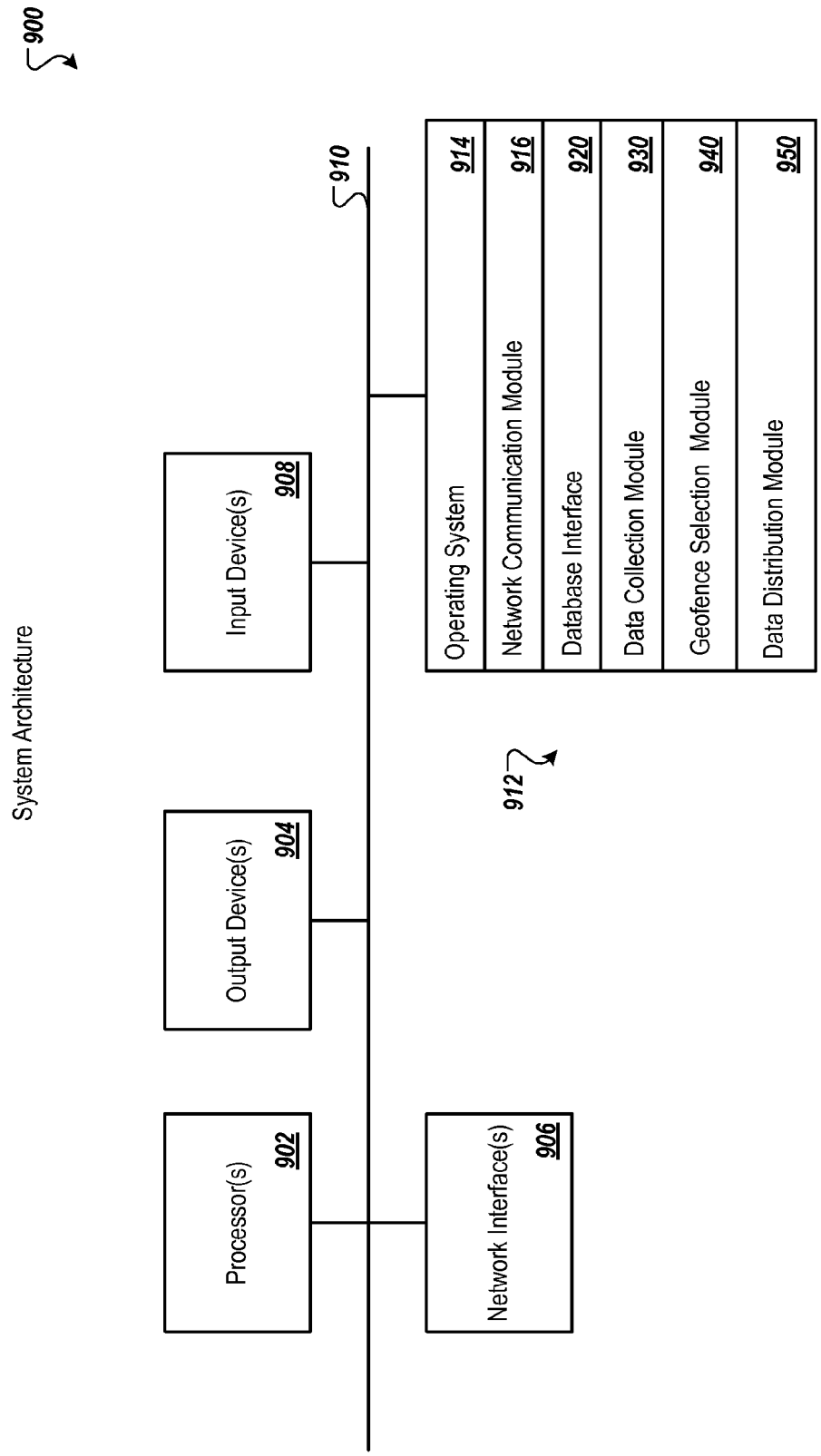
FIG. 9 is a block diagram of an exemplary system architecture for implementing the features and operations of selective location determination on a server.

FIG. 9 is a block diagram of an exemplary system architecture for implementing the features and operations of selective location determination on a server. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, data collection module 930, data distribution module 940, and location calculation subsystem 950. Data collection module 930, data distribution module 940, and geofence selection module 950 can be used to implement functions context-based reverse geocoding. Operating system 914 can be multi-user, multiprocessing, multitasking, multithreading, real time, etc. Operating system 914 performs basic tasks, including but not limited to: recognizing input from and providing output to devices 906, 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interfaces to one or more databases (e.g., gateway data store 422 and geofence data store 424) on a file system. The data stores can be organized under a hierarchical folder structure, the folders mapping to directories in the file system. Data collection module 930 can collect location data of wireless access gateways, definition of one or more geofences, as well as information related to the geofences. Geofence selection module 940 can receive request for geofence information, select one or more geofences based on location information and context of the location information in the request, and identify content associated with the selected geofences. Data distribution module 950 can send information of the selected geofences and the identified content to a requesting device.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communications network. Examples of communications networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, locations of a mobile device, when uncertainty is involved, are represented as circles in the figures. The actual shape of a location of the mobile device can have many geometric form (e.g., polygons, ellipses, or other shapes).

What is claimed is:

1. A method executed on a mobile device, comprising:
determining a first location of the mobile device, the first location including an area defined by a point and an error margin extending from the point, the point being represented by a latitude coordinate and a longitude coordinate, the error margin corresponding to a level of confidence that the mobile device is located in the area, the first location intersecting a first geographic area defined by a first geofence and a second geographic area defined by a second geofence,
each of the first geographic area and second geographic area corresponding to a geographic feature and being associated with one or more selection criteria that, if satisfied, indicate that the mobile device has entered the corresponding geofence;
calculating a traveling speed and direction of the mobile device; based on the calculated traveling speed and direction of the mobile device,
selecting one of the first geofence and the second geofence, including determining that the travelling speed and direction satisfy the one or more selection criteria of the selected geofence;
determining a second location of the mobile device based on the first location and the selected geofence, the second location including a portion of the first location that intersects the selected geofence; and
providing the second location and contextual information of the selected geofence for display on a display screen of the mobile device;
wherein the one or more selection criteria include a speed limit of the mobile device traveling in the geographic area of the corresponding geofence.

2. The method of claim 1, comprising executing an application program associated with the selected geofence.

3. A method system comprising:
a mobile device; and
a non-transitory computer-readable storage medium storing instructions operable to cause the mobile device to perform operations comprising:
determining a first location of the mobile device, the first location including an area defined by a point and an error margin extending from the point, the point being represented by a latitude coordinate and a longitude coordinate, the error margin corresponding to a level of confidence that the mobile device is located in the area, the first location intersecting a first geographic area defined by a first geofence and a second geographic area defined by a second geofence,
each of the first geographic area and second geographic area corresponding to a geographic feature and being associated with one or more selection criteria that, if satisfied, indicate that and a context of the current location, the context including a pattern of movement of the mobile device has entered the corresponding geofence;
calculating a traveling speed and direction of the mobile device; based on the calculated traveling speed and direction of the mobile device, selecting one of the first geofence and the second geofence, including determining that the travelling speed and direction satisfy the one or more selection criteria of the selected geofence;
determining a second location of the mobile device based on the first location and the selected geofence, the second location including a portion of the first location that intersects the selected geofence; and
providing the second location and contextual information of the selected geofence for display on a display screen of the mobile device;

wherein the one or more selection criteria include a speed limit of the mobile device traveling in the geographic area of the corresponding geofence.

4. The system of claim 3, where the first location has a size corresponding to a horizontal accuracy of the first location.

5. The system of claim 3, further including requesting, to a server, content related to the selected geofence for display on the mobile device.

6. The system of claim 3, wherein the one or more selection criteria include a speed limit of the mobile device traveling in the geographic area of the corresponding geofence.

7. A non-transitory computer-readable storage medium storing instructions operable to cause the mobile device to perform operations comprising:

determining a first location of the mobile device, the first location including an area defined by a point and an error margin extending from the point, the point being represented by a latitude coordinate and a longitude coordinate, the error margin corresponding to a level of confidence that the mobile device is located in the area, the first location intersecting a first geographic area defined by a first geofence and a second geographic area defined by a second geofence, each of the first geographic area and second geographic area corresponding to a geographic feature and being associated with one or more selection criteria that, if satisfied, indicate that the mobile device has entered the corresponding geofence; calculating a traveling speed and direction of the mobile device; based on the calculated traveling speed and direction of the mobile device, selecting one of the first geofence and the second geofence, including determining that the travelling speed and direction satisfy the one or more selection criteria of the selected geofence;

determining a second location of the mobile device based on the first location and the selected geofence, the second location including a portion of the first location that intersects the selected geofence; and providing the second location and contextual information of the selected geofence for display on a display screen of the mobile device;

wherein the one or more selection criteria include a speed limit of the mobile device traveling in the geographic area of the corresponding geofence.

8. The storage medium of claim 7, the operations comprising executing an application program associated with the selected geofence.

* * * * *

UNITED STATES PATENT AND TRADEMARK OFFICE
CERTIFICATE OF CORRECTION

PATENT NO. : 8,489,127 B2
APPLICATION NO. : 12/764057
DATED : July 16, 2013
INVENTOR(S) : Ronald Keryuan Huang et al.

Page 1 of 1

It is certified that error appears in the above-identified patent and that said Letters Patent is hereby corrected as shown below:

In the Claims

In Claim 3, column 22, line 35, delete "A method system" and insert -- A system --.

In Claim 3, column 22, line 52-53, delete "that and a context of the current location, the context including a pattern of movement of the" and insert -- that the --.

Signed and Sealed this
Twenty-fourth Day of September, 2013

Teresa Stanek Rea
*Deputy Director of the United States Patent and Trademark Office*